Dec. 10, 1957  H. H. FISHER, JR  2,815,925
VALVES FOR CONTROLLING FLUIDS IN WELL BORES
Filed Jan. 20, 1955  2 Sheets-Sheet 1
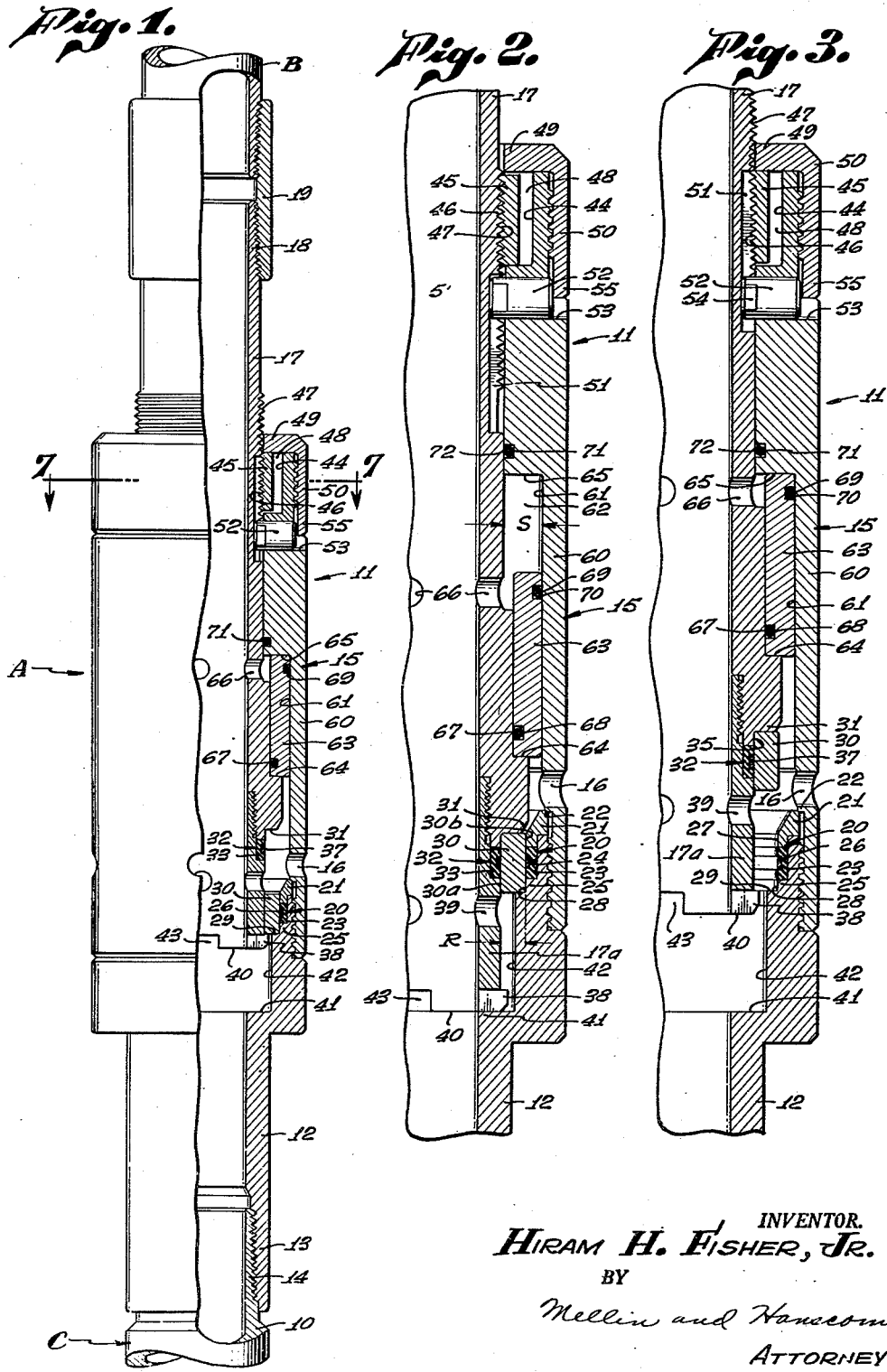
INVENTOR.
HIRAM H. FISHER, JR.
BY
Mellin and Hanscom
ATTORNEYS Dec. 10, 1957     H. H. FISHER, JR     2,815,925
VALVES FOR CONTROLLING FLUIDS IN WELL BORES
Filed Jan. 20, 1955     2 Sheets-Sheet 2
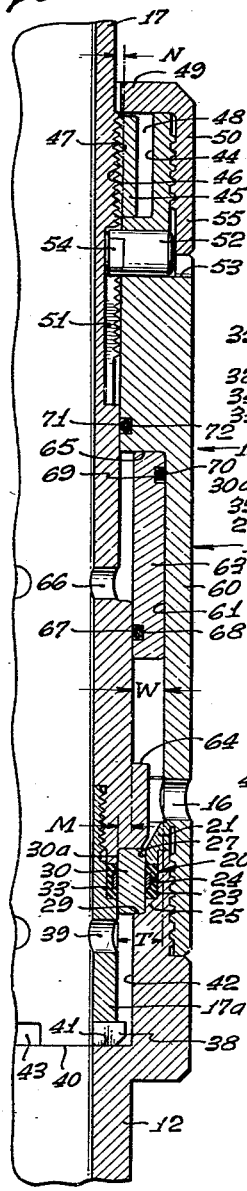
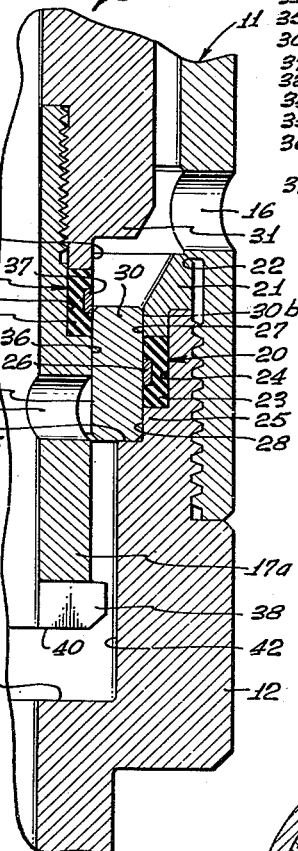
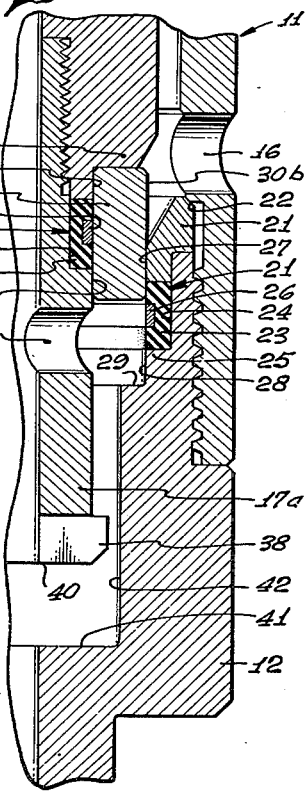
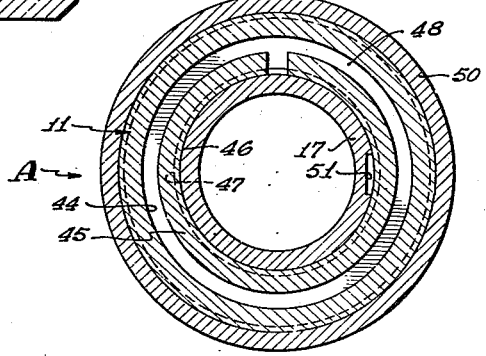
INVENTOR.
HIRAM H. FISHER, JR.
BY
Mellin and Hanscom
ATTORNEYS United States Patent Office 2,815,925
Patented Dec. 10, 1957

2,815,925
VALVES FOR CONTROLLING FLUIDS IN WELL BORES

Hiram H. Fisher, Jr., Houston, Tex., assignor to Baker Oil Tools, Inc., Los Angeles, Calif., a corporation of California Application January 20, 1955, Serial No. 482,958

11 Claims. (Cl. 251—347)

The present invention relates to valve apparatus, and more particularly to apparatus useful in controlling the passage of fluid between the interior and exterior of a string of tubing, drill pipe, and the like, disposed in a well bore.

Valves may embody rubber, or rubber-like, rings, for sealing against a companion surface to prevent leakage through the valve when in closed position. In manipulating a valve between open and closed position, especially where high fluid pressure differentials are present, the elastic seal rings may be blown from the valve member in which it is mounted, resulting in failure of the valve mechanism.

An object of the present invention is to provide valve apparatus embodying one or more rubber or similar elastic seal rings relatively movable into and out of sealing engagement with a companion valve member, in which the seal ring or rings cannot be blown or otherwise forced by fluid pressure from its appropriate assembled relation in the valve apparatus when the latter is moved between open and closed positions, regardless of the direction in which the pressure is applied in the apparatus and on the seal rings. In general, the seal rings remain in proper position during the opening and closing of the valve, irrespective of the fact that the direction of pressure application on the valve may be reversed, and despite the existence of exceedingly high pressure differentials across the seal rings.

In valve apparatus to be embodied in a tubular string for operation in a well bore, the valve is manipulated to close it and prevent flow of fluid between its interior and exterior, or to open the valve to allow such flow of fluid. When closed, there may be a predominance of pressure internally of the valve and tubular string, or the greater pressure may be present externally of the valve and tubular string. When a rubber, or similar elastic, seal ring is used in the valve apparatus to insure against leakage, such ring may be forced out of its proper assembled relation when the valve is either opened or closed, depending upon the existence of a pressure differential internally of the valve and tubular string or externally thereof. If an internal fluid pressure differential does not tend to displace or blow the elastic seal ring from its proper position when the valve parts are shifted between open and closed positions, such displacement will tend to occur if the fluid pressure differential is present externally of the tubular string and valve. On the other hand, valve arrangements in which an external fluid pressure does not tend to blow the elastic seal ring from its assembled position are faced with such tendency when the fluid pressure differential is reversed, with a predominance of pressure present internally of the valve apparatus and tubular string.

Accordingly, another object of the invention is to provide a valve apparatus, particularly adapted to be attached to a tubular string for use in a well bore, in which its elastic seal ring or rings cannot be blown out of assembled position in the valve apparatus during opening and closing of the valve, when the fluid pressure differential is internally of the tubular string and valve apparatus, as well as when it is externally thereof.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a combined longitudinal sectional and side elevational view of an embodiment of the invention, with the valve disclosed in open position;

Fig. 2 is a quarter sectional view of the valve apparatus disclosed in closed position;

Fig. 3 is a view similar to Fig. 2, with the valve in open position and the parts occupying a somewhat different relative position than disclosed in Fig. 1;

Fig. 4 is a view similar to Fig. 2, with the valve in closed position, with some of the parts occupying a different position from that disclosed in Fig. 2;

Fig. 5 is an enlarged fragmentary longitudinal section through the valve apparatus, disclosing the valve during its movement to open position, with a predominance of fluid pressure internally of the valve mechanism;

Fig. 6 is a view similar to Fig. 5, disclosing the movement of the valve to open position and with a predominance of fluid pressure externally of the valve apparatus;

Fig. 7 is an enlarged cross-section taken along the line 7—7 of Fig. 1.

As disclosed in the drawings, the upper end of a control valve device A is connected to the lower portion of a tubular string B, the lower end of the valve device, in turn, being connected to the body or mandrel 10 of another tool C disposed therebelow, such as a well packer adapted to be set against the wall of a confining well casing (not shown), in which the entire apparatus may be lowered and used.

The control valve apparatus A includes an elongate tubular outer housing or body 11, which, for convenience of manufacture and assembly, is made of several parts. Thus, the housing includes a lower member 12 having a lower threaded box 13 for the reception of the upper threaded pin 14 of the mandrel 10 of the lower tool. The upper end of the lower housing portion 12 is threadedly received within and is attached to the lower end of an upper housing portion 15, which has a plurality of circumferentially spaced side ports or openings 16 therethrough through which fluid can flow between the interior and exterior of the housing 11. A tubular mandrel 17 is telescopically received within the housing 11, the upper end of this mandrel having a threaded pin 18 for threaded attachment to a collar or coupling sleeve 19 which, in turn, is threaded onto the lower end of the string of tubing B, or similar tubular string, extending to the top of the well bore in which the apparatus is to be used, and by means of which the apparatus A, C is lowered or raised within the well bore.

The outer housing or body 11 has an internal generally cylindrical valve seat structure 20 provided in the lower member 12 below the circulation ports 16 and in a clamp ring 21 that is secured between the upper end of the lower member 12 and a shoulder 22 of the upper housing member 15. This internal valve seat structure 20 includes a rubber or rubber-like seal ring 23 disposed within a groove 24 in the lower housing member, the ring being held against the lower side 25 of the groove by the clamp ring 21, which, in effect, provides the upper side of the groove. The elastic seal ring 23 is of generally U-shaped cross-section containing a metallic ring 26 therein, the inner surface of this ring 26 being substantially flush with the inner surface of the elastic seal ring 23 in opposite sides thereof. Such surfaces are substantially aligned with the internal metallic surface 27 of the clamp ring 21 and an internal metallic surface 28 in the lower body member immediately below the seal ring, which terminates at an inwardly directed stop shoulder or abutment 29.

The internal cylindrical seat structure 20 is adapted to cooperate with a floating valve head and seat member 30 encompassing the mandrel and having an external diameter substantially equal to the internal diameter of the clamp ring 21, seal ring 23, metallic insert 26 in the seal ring, and the wall 28 of the lower housing member immediately below the seal ring 23. The internal diameter of the head and seat member 30 is substantially the same as the external diameter of the lower portion 17a of the mandrel 17, this head and seat member 30 being adapted to occupy an upper position on the mandrel in engagement with an upper stop shoulder 31 formed on the latter, in which position the inner surface of the head and seat member 30 engages a sealing structure 32 on the mandrel 17, which is similar to the internal valve seat structure 20. Thus, the seal structure 32 includes a seal ring 33 of generally U-shaped cross-section contained within a ring groove 34 jointly provided by the lower end of the main mandrel portion 17 and the lower mandrel portion 17a. The ring 30 will slidably engage a cylindrical surface 35 immediately above the elastic seal ring 33 simultaneously with its engagement with the periphery of the seal ring 34 and with the cylindrical surface 36 of the mandrel member below the seal ring. Here again, the seal ring 34 has a metallic reinforcing ring member 37 in its periphery which is adapted to slidably engage the inner wall of the head and seat member 30.

The head and seat member 30 is movable downwardly relative to the mandrel into a position in engagement with an outwardly directed shoulder 38 formed on the lower portion 17a of the mandrel. In moving between its upper and lower positions on the mandrel, the head and seat member 30 will move across a plurality of side ports 39 in the mandrel. When in its uppermost position, it is located above these ports, and when in its lowermost position, it is located below these ports. The mandrel 17 is movable downwardly in the housing 11 to the extent determined by engagement of its lower end 40 with the shoulder 41 of a counterbore 42 in the lower housing member. Fluid can pass around the lower end of the mandrel to its exterior when engaged with the shoulder 41, by virtue of circumferentially spaced notches 43 provided in the lower portion of the mandrel.

When the mandrel 17 is moved downwardly within the housing 11, the upper stop shoulder 31 will engage the floating valve head and seat member 30 and move it downwardly with it until the head and seat member engages the stop shoulder or abutment 29 on the lower housing member 12. At this time, the periphery of the head and seat member 30 is disposed across the valve seat structure 20, and the inner surface of the head and seat member 30 is disposed across the sealing structure 32 on the mandrel 17, 17a (Figs. 2 and 4). When the parts occupy the position just described, the valve is in closed position, and fluid is incapable of passing through the ports 16 between the interior and exterior of the valve structure. Upon elevation of the mandrel 17 with respect to the housing 11, the head and seat member 30 may be disposed in its upper position against the upper stop shoulder 31, but it will be removed above the location of the internal cylindrical seating structure 20 (see Fig. 3). Accordingly, the circulation ports 16 are now open, allowing fluid to be pumped from the interior of the valve mechanism, through the mandrel side ports 39, as well as around the lower end 40 of the mandrel, and out through the circulation ports 16 to the exterior of the valve structure. Of course, fluid can also pass in the reverse direction when the parts occupy the relative position just described.

In lieu of the head and seat member 30 being disposed in the upward position, as shown in Fig. 3, the mandrel 17 may be elevated and the ring 30 will remain in its lower position disposed across the internal cylindrical seating structure 20. However, the mandrel ports 39 are then disposed above the head and seat member 30, which will allow fluid to flow in either direction between the interior of the valve and its exterior, by passing through the mandrel ports 39 and the circulation ports or openings 16 in the housing 11.

The mandrel 17 is moved in an upward and downward direction with respect to the housing 11 for the purpose of either opening or closing the circulation ports 16 by longitudinally manipulating or moving the tubular string B. To secure the appropriate relative movement between the mandrel and the housing, the movement of the latter is resisted or restrained. Such restraint may be provided by the lower tool C secured to the lower end of the housing 11. As indicated above, this tool may be in the form of a well packer, which can be anchored in packed-off condition against the well casing by moving the lower body 10 of the tool C in a downward direction. Ordinarily, such tool incorporates friction drag springs or drag blocks adapted to frictionally engage the wall of the well casing, resisting movement of the packer or lower tool therewithin. The details of the lower tool are unnecessary to an understanding of the present invention, since they are old and well known. It is sufficient to state that the lower tool embodies elements for resisting longitudinal movement of the housing 11 within the well casing in which the apparatus is to be used.

During lowering of the apparatus in the well casing or well bore, it may be desired to retain the valve in open position. However, the downward force being imposed by the tubular string B on the inner mandrel 17 tends to shift the latter downward, to dispose the inner seal structure 32 within the valve head and seat member 30, and the latter within the internal seat structure 20, or in the position disclosed in Fig. 2, thereby closing the circulation ports 16. Such downward movement may be prevented by a releasable retaining or holding device provided between the mandrel 17 and the housing 11. As specifically shown, the upper portion of the housing contains an internal groove 44 in which a split, inherently contractible ratchet sleeve 45 is located. This sleeve 45 has internal teeth 46 tending to mesh with external teeth 47 on the upper portion of the mandrel 17. The teeth 46 are circumferential and may be actually formed as internal helical threads within the ratchet sleeve 45, there being companion external helical threads 47 on the mandrel, both threads being generally V-shaped in cross-section, so that a downward or upward force of sufficient magnitude imposed on the inner mandrel 17 will tend to cause its circumferential teeth 47 to cam or expand the ratchet sleeve 45 in an outward direction, and permit the mandrel 17 to move either downwardly or upwardly within the ratchet sleeve 45 and the housing 11. Such outward expansion is permitted by providing sufficient annular clearance 48 between the periphery of the ratchet sleeve 45 and the base of the circumferential groove 44 formed in the housing. The ratchet sleeve 45 itself is precluded from partaking of any substantial longitudinal movement by engaging the lower and upper sides of the groove 44. The upper side of the groove may be provided by an inwardly directed flange 49 of a retainer nut 50 threaded on the upper end of the housing 11.

In the manipulation of the lower tool C it is oftentimes necessary for the body 10 to be partially turned or rotated in one direction or the other. In the present instance, the rotary motion may be transmitted from the tubular string B and the inner mandrel 17 of the valve apparatus to the housing 11, and from the housing to the body 10 of the lower tool by means of a key and keyway slidable connection. Thus, a longitudinal keyway or slot 51 is provided in the exterior of the mandrel 17, receiving a key 52 inserted through a lateral hole 53 extending through the housing 11 immediately below the ratchet sleeve 45. The key 52 may be constituted by a cylindrical pin having flat opposed sides 54 slidably engageable with the opposed sides of the keyway 51, the key 52 being prevented from shifting outwardly by a depending skirt 55 on the retainer nut 50 partially overlying the lateral hole 53 through the housing.

It is apparent that the key 52 will permit upward and downward movement of the mandrel 17 with respect to the housing 11, regardless of the relative position between the mandrel and housing. The rotation of the mandrel 17 in either direction can be transmitted through the key 52 to the housing 11, from which it is conveyed to the body 10 of the lower tool C.

When the mandrel 17 is in its lowermost position within the housing 11, the inner seal structure 32 is engaging the cylindrical inner wall 30a of the valve head and seat member 30, the periphery 30b of the latter being disposed within the cylindrical seat structure 20 provided in the housing 11. When in this position, the valve mechanism A is closed against passage of fluid in both directions between the interior of the mandrel 17 and the exterior of the housing 11. The valve sealing arrangement disclosed and described is provided to preclude the fluid pressure, whether internally or externally of the valve structure, from inadvertently removing the rubber or rubber-like sealing members 33, 23 from their appropriate position on the mandrel 17 and housing 11, which tendency has heretofore occurred when the valve has been shifted to open position or to closed position.

Assuming the valve to be in the closed position shown in Fig. 2, and that it is desired to open the valve by relatively elevating the mandrel 17 within the housing 11, and assuming further that the pressure internally of the mandrel is substantially greater than that externally of the housing, the elevation of the mandrel 17 will cause the fluid pressure to shift the valve head and seat member 30 in an upward direction with the mandrel, holding the head and seat member 30 against the upper stop shoulders 31 and across the inner seal structure 32. In the course of the upward movement of the head and seat member 30 across the rubber ring 23, the latter is gradually and progressively exposed to the internal pressure within the mandrel 17 and the housing 11 (Fig. 5), this pressure tending to force the seal ring 23 in an outward direction, and thereby tending to retain it in its groove 24. Upon elevation of the mandrel 17 to a sufficient extent, the head and seat member 30 is disposed completely above the rubber seal ring 23, but this seal ring is then being subjected to the fluid pressure along its whole interior face, as well as over its opposite ends. The mandrel 17 can be elevated to its fullest extent, the head and seat member 30 occupying the upper position disclosed in Fig. 3, in which the valve is open.

During the initial elevation of the head and seat member 30, the elastic seal ring 23 is subjected to a pressure differential, inasmuch as the pressure below the seal ring 23 is substantially greater than the pressure above the seal ring 23. However, the periphery 30b of the head and seat member 30 makes a relatively close sliding fit with the cylindrical wall 27 of the clamp ring 21, and provides very little clearance space through which the elastic material can be forced. Actually, the inner face of the elastic seal ring 23 is supported by the periphery 30b of the head and seat member 30, and the only unsupported portions of the inner face are subjected to the pressure internally of the apparatus, which tends to force and retain the ring 23 within the housing groove 24.

Assuming that the valve is to be closed from the position disclosed in Fig. 3, and that the pressure internally of the valve mechanism is still greater than the pressure externally of the valve mechanism, then the lowering of the mandrel 17 and the head and seat member 30 will place the periphery 30b of the latter within the clamp ring 21 and then slide it along the face of the elastic seal member 23. However, here again the face of the seal ring is again supported by the periphery 30b of the head and seat member 30, the pressure within the mandrel 17 and housing 11 acting in an outward direction tending to hold the ring 23 in the groove 24. The ring 23 is not exposed to any pressure differentials, with any portions of the seal ring unsupported by the housing 11 or the metallic head and seat member 30 which might cause the pressure differential to force it out of its groove 24.

If it is assumed that the valve mechanism is in a closed position, with a predominance of fluid pressure externally of the housing 11, rather than internally of the mandrel 17, and it is desired to shift the valve to open position, the mandrel 17 is elevated, the valve and head member 30 remaining completely within the housing and across the cylindrical seating structure 20, inasmuch as the external fluid pressure is acting in a downward direction on the head and seat member 30 and will retain it in its lowermost position within the housing. Accordingly, the inner sealing structure 32 on the mandrel will be elevated within the head and seat member 30 (as shown in Fig. 6) during opening of the valve. The elastic seal ring 33 of this structure is at first completely covered by the inner face 30a of the head and seat member 30, and as the mandrel 17 is elevated, the elastic ring 33 is progressively moved above the upper end of the head and seat member 30. As the outer face of the seal ring 33 becomes exposed to a greater extent, the high pressure externally of the housing 11 and passing through the circulation ports 16 will act on the seal ring and tend to force it inwardly to retain it in the mandrel groove 34. The pressure differential across the ring 33 cannot force it in a downward direction out of its groove 34, inasmuch as the inner cylindrical surface 30a of the head and seat member 30 is disposed across the unexposed portion of the seal ring 33. When the ring 33 has been completely elevated out of the head member 30, then all portions of it are subjected to the high external pressure, the ring 33 being in a substantially balanced state. The valve can be fully opened by elevating the mandrel 17 to its fullest extent, such as disclosed in Fig. 1.

Assuming that there is still a predominance of fluid pressure externally of the housing 11 over that internally of the mandrel 17 and the tubular spring B, and that it is desired to close the valve, the mandrel 17 is lowered, its seal structure 32 being progressively returned within the confines of the head and seat member 30. However, the exposed face of the seal 33 is subjected to the high pressure externally of the valve, which will tend to retain it within its groove 34, its unexposed face being supported by the inner wall 30a of the head and seat member 30, which makes a close sliding fit with the periphery of the mandrel portion 17a. As a result, there is insufficient clearance space between the mandrel 17a and the inner wall 30a of the head and seat member 30 through which the rubber, or similar elastic, seal member 33 can be forced. When the mandrel 17 has been lowered to its fullest extent, the seal structure 32 is disposed completely within the valve and seat member 30, the latter resting upon the lower stop shoulder 29. The valve is now in fully closed position against passage of fluid in both directions between the interior of the mandrel 17 and the exterior of the housing 11.

Assuming that the apparatus has been disposed in the well casing, with the valve in the closed position shown in Fig. 2, and with a predominance of fluid pressure within the tubular string B, the latter pressure is acting over the cross-sectional area of the lower end of the mandrel 17 and of the floating head and seat member 30, tending to elevate the mandrel 17, head and seat member 30 and the tubular string B, or, conversely, tending to shift the housing 11 downwardly, for the purpose of opening the valve. Actually, the combined area of the mandrel 17 and the head and seat member 30 referred to above is the area across the cylindrical valve seat structure 20. Similarly, any fluid pressure in the annulus between the tubular string B and apparatus A, on the one hand, and the well casing, on the other hand, may tend to act on the housing 11 for the purpose of shifting the latter in a downward direction, inadvertently opening the valve. In the present instance, both the aforenoted tendencies are overcome by a hydraulic counter-balancing device acting either within the apparatus or externally thereof, depending upon whether the predominance of pressure is internal or external of the apparatus, so that the hydraulic pressure has substantially no effect, or very little effect, in tending to alter the relative positions between the mandrel 17 and the housing 11.

The housing 11 includes a cylinder portion 60 having an internal cylinder wall 61 of substantially greater diameter than the periphery of the mandrel 17 and of the cylindrical seating structure 20, to provide an annular space 62 between the mandrel and the housing, in which an annular floating piston 63 is received. This piston is disposed above the cylindrical seating structure 20 and the mandrel seating structure 32, as well as above the circulation ports or openings 16, being capable of sliding movement along both the cylindrical wall 61 of the cylinder 60 and the periphery of the mandrel 17. This piston 63 may occupy a lower position along the mandrel, as determined by its engagement with a lower mandrel shoulder 64. It may also move upwardly along the wall 61 of the cylinder into engagement with an upper cylinder head or shoulder 65.

When the piston 63 is engaged with the lower mandrel shoulder 64, it can be acted on by fluid under pressure within the mandrel 17 and urged in a downward direction, this fluid under pressure entering the cylinder space 62 above the piston 63 through one or more side ports 66 provided in the mandrel. Such fluid under pressure acts in a downward direction on the piston 63, the force of the piston being transmitted in a downward direction to the inner mandrel 17 by the abutting of the piston against the mandrel shoulder 64. When the piston 63 is in its upper position within the cylinder 60 in engagement with the upper cylinder head 65, it can be acted on by fluid pressure externally of the apparatus, which passes through the circulation port 16 into the annular cylinder space below the piston 63, the force of this fluid acting in an upward direction on the piston, being transmitted by the piston to the outer housing 11 through the cylinder head 65.

Leakage of fluid between the periphery of the mandrel 17 and piston 63 is prevented by a rubber or rubber-like seal ring 67, such as an O ring, in an internal circumferential groove 68 in the lower portion of the piston, which slidably engages the periphery of the mandrel. Leakage of fluid between the cylinder 60 and the periphery of the piston may be prevented by a rubber or rubber-like side seal ring 69, such as a rubber O ring, in an external circumferential groove 70 on the upper portion of the piston 63, which slidably and sealingly engages the cylinder wall 61. These two seal rings 67, 69 jointly prevent fluid from passing in a downward direction out of the cylinder space 62 above the piston and along the inner and exterior surfaces of the latter. Fluid under pressure is prevented from passing in an upward direction out of the cylinder 60 by a seal ring 71, such as a rubber or rubber-like O ring, contained in an internal circumferential groove 72 in the cylinder head 65, and slidably and sealingly engaging the periphery of the mandrel 17.

When the mandrel 17 has been disposed in its lower position within the housing 11, to close the valve, the parts may be disposed in the position disclosed in Fig. 2, in which the mandrel sealing structure 32 is sealed against the inner wall 30a of the floating valve head and seat member 30, and with the outer surface 30b of the latter being appropriately disposed within the cylindrical seating structure 20. Fluid under pressure within the tubular string B and the mandrel 17 will pass through the upper port or ports 66 into the cylinder space 62 above the piston 63, urging the latter in a downward direction into engagement with the mandrel shoulder 64. This fluid under pressure will not only act in a downward direction on the piston 63, but also over a portion of the mandrel area between the inner surface of the piston and the periphery of the mandrel on which the head 65 is relatively slidable. In other words, the fluid under pressure internally of the mandrel 17 is acting on the mandrel in a downward direction over the area S, which area may be made equal to the area R across the cylindrical seating structure 20 over which the fluid pressure is acting in an upward direction, tending to elevate the mandrel. If the areas R and S are made equal, then the hydraulic forces are completely counterbalanced, there being no tendency for the fluid under pressure internally of the apparatus to shift the valve device in either direction. Accordingly, it is unnecessary to impose any downward force on the tubular string B and inner mandrel 17 to hold the valve in closed position.

It is not essential that the areas R and S be made equal. If desired, some variance between them may be embodied in the apparatus. If the area S is made somewhat less than the area R, than the hydraulic pressure will not be completely counterbalanced, and it will be necessary to impose some downward force on the mandrel 17 to hold the valve in closed position. On the other hand, if the area S is made somewhat greater than the area R, the hydraulic forces will tend to retain the valve in closed position, making it necessary to exert some upward force on the tubing string B and inner mandrel 17 to overcome the unbalanced hydraulic force and shift the valve to open position, with pressure still present within the tubular string and mandrel.

Assuming the valve to be in closed position, with a predominance of pressure in the annulus between the tubular string B and the well casing, the hydraulic counterbalancing arrangement is effective to prevent such fluid pressure from tending to open the valve. With such predominance of fluid pressure externally of the apparatus, the pressure will be exerted through the circulation ports or openings 16, acting on the lower end of the piston 63 and shifting it upwardly along the mandrel 17 and cylinder wall 61 into engagement with the upper cylinder head 65 (Fig. 4). Thereafter, the hydraulic force acting in an upward direction on the piston 63 is being transmitted through the cylinder head 65 to the outer housing 11, tending to shift the housing in an upward direction. Such hydraulic force is acting on the piston over an annular area W, which is the annular area between the periphery of the mandrel 17 below the piston 63 and the cylinder wall 61 along which the piston is slidable. However, such upward hydraulic force is offset by the action of the fluid pressure acting in a downward direction on the housing 11 over the annular area T, this area being the sum of the annular areas between the periphery of the cylindrical seat structure 20 and the inner wall 61 of the cylinder along which the piston 63 is slidable and the annular area across the valve head and seat member 30. Thus, the fluid will act in a downward direction over the housing 11, such as on the upper end of the lower housing portion 21 and the upper end of the head and seat member 30, tending to urge the housing in a downward direction. If the areas W and T are made equal, then the external fluid pressure is counterebalanced insofar as the housing 11 is concerned, and there will be no tendency for the fluid pressure to shift the housing in one direction or the other, the valve remaining in closed position. Of course, the areas W and T can be made dissimilar, if desired. The making of the area W greater than the area T will produce a tendency for the external fluid pressure to hold the valve in closed position. On the other hand, the making of the area W less than the area T will still provide some tendency for the external fluid pressure to shift the housing 11 downwardly to valve opening position, which tendency must be overcome by some other force, although, of course, the force required is much less than if the floating piston 63 were not available at all.

The external fluid pressure is also acting on the mandrel within the cylinder 60 below the piston 63 over an area M, which is the annular area between the periphery of the mandrel on which the piston is slidable and the periphery of the mandrel sealing structure 32. If the diameter of the mandrel sealing structure 32 and the diameter of the peripheral portion of the mandrel referred to were made equal, there would be no resultant area over which the external fluid pressure within the cylinder would be acting on the mandrel 17. In any event, the fluid pressure is also acting in a downward direction on the mandrel over the annular area N, which is the projected annular area between the periphery of the mandrel at its upper end and the periphery of the mandrel which is slidable along the cylinder head 65 and the head seal ring 71. If the area N is made eqaul to the area M, then the effect of hydraulic pressure externally of the apparatus on the mandrel 17 is nullified. For that matter, the diameters of the upper portion of the inner mandrel above its ratchet teeth 47 and of the portion slidable along thhe cylinder head 65 can be made equal, in which event the resultant area N would not exist.

In the use of the apparatus, its upper end is connected to the lower portion of the tubular string B and its lower end to the tool C secured therebelow. Preferably, the valve apparatus is disposed in an open position such as shown in Fig. 1, with the releasable ratchet sleeve 45 engaging the inner mandrel 17, to preclude its inadvertent downward movement within the housing 11 to close the circulation ports 16. The apparatus is run in the well bore until the location is reached at which it is to be used, the tubular string B and inner mandrel 17 being rotated to transmit such motion through the key 52 to the housing 11, and from the housing to the body 10 of the lower tool C, in order to unlatch the latter and enable it to be anchored in packed-off condition against the well casing. Ordinarily, such packing off occurs by not only turning the tubular string B, inner mandrel 17, housing 11 and body 10 in the proper direction, but also by exerting a downward force on the body 10 of the lower tool. The tubular string B is lowered to exert such downward force, which is transmitted through the mandrel 17 and ratchet sleeve 45 to the housing 11, and from the latter to the body 10 of the tool C. Since the anchoring of the lower tool to the casing will prevent further downward movement of the valve housing 11, the exertion of a sufficient downward effort on the tubular string B and inner mandrel 17 will cause the V-shaped ratchet teeth 47 of the mandrel to cam the ratchet sleeve 45 laterally outward, and allow the inner mandrel 17 to move downwardly within the housing 11, to dispose the sealing structure 32 on the mandrel completely within the floating valve head and seat member 30, which may be already disposed completely within the cylindrical valve seat structure 20. If the valve head and seat member 30 is not in its lowermost position, then the lowering of the mandrel 17 will cause the upper stop shoulder 31 to engage the head and seat member 30 and carry it downwardly completely within the cylindrical valve seat structure 20. The extent of downward movement of the mandrel 17 within the housing can be determined by the engagement of the lower end 40 of the mandrel with the lower shoulder 41 in the housing 11, or by the engagement of the valve head and seat member 30 with the stop shoulder or abutment 29 disposed at the lower end of the cylindrical valve seating structure 20.

Fluid under pressure may now be pumped down the tubular string B; this fluid passing through the inner mandrel 17 into the lower housing member 12 and through the body 10 of the lower tool C to a location therebelow. This fluid under pressure is acting through the ports 66 to shift the piston 63 in a downward direction along the mandrel 17 into engagement with the mandrel shoulder 64, the fluid force then being imposed in a downward direction on the piston 63 and mandrel over the annular area S, offsetting the action of the fluid pressure acting in an upward direction on the mandrel 17 and valve head and seat member 30 over the cross-sectional area R. If the areas R and S are made equal, there is no resultant hydraulic force tending to shift the mandrel 17 in either direction, and the valve will remain in closed position.

When the valve is to be opened, it is merely necessary to take an upward pull on the tubular string B, despite the existence of relatively high pressure differentials within the mandrel. This will cause the mandrel ratchet teeth 47 to cam and expand the ratchet sleeve 45 out of engagement therewith, allowing the mandrel 17 to move upwardly to the port opening position disclosed in Fig. 3. During such upward movement, the valve head and seat member 30 will remain disposed across the mandrel sealing structure 32, the fluid pressure holding the head and seat member 30 against the upper stop shoulder 31. As described above, during the course of the upward movement, the outer periphery of the head and seat member 30 will gradually expose the elastic seal ring 23 of the outer cylindrical seating structure 20 to the high pressure within the valve apparatus. This pressure will tend to hold the seal ring 23 in its confining groove 24.

In the event the annulus around the tubular string B and apparatus A is subject to pressure, which pressure can be provided by forcing fluid down through this annulus, or by swabbing the interior of the tubular string B to remove fluid therefrom, the fluid under pressure externally of the apparatus will pass through the valve ports 16 and shift the floating piston 63 upwardly into engagement with the cylinder head 64. Assuming the valve to be closed, the parts will then occupy the position disclosed in Fig. 4. The fluid under pressure will act in an upward direction over the piston 63 and housing 11 over the annular area W, and in a downward direction over the annular area T, tending to hold the valve head and seat member 30 in a downward position within the seat structure 20. If these areas are made equal to each other, the fluid under pressure is counterbalanced and there will be no tendency for the fluid pressure to shift the valve to open position, or, for that matter, to retain it in closed position. When desired, the valve is shifted to open position merely by elevating the tubular string B and the mandrel 17 with respect to the housing. During such elevating movement, the pressure will hold the annular head and seat member 30 in a downward position entirely within the cylindrical seating structure 20, the inner seal structure 32 being raised out of the valve head and seat member 30, the seal ring 33 being progressively exposed to the high pressure of fluid in the annulus around the apparatus. However, as explained above, such pressure will tend to force and hold the elastic mandrel seal ring 33 within its confining groove 34.

The elevating tendency of the mandrel 17 is not prevented by external hydraulic pressure, inasmuch as the annular area N over which the external pressure is acting in a downward direction on the mandrel may be made substantially equal to the annular area M, over which the hydraulic pressure is acting in an upward direction over the mandrel.

Once the valve has been shifted to open position, it will remain in such open position during elevation of the apparatus in the well bore, inasmuch as the tubular string B and mandrel 17 are being moved in an upward direction. In any event, the mere downward movement of the tubular string and mandrel will not reshift the valve to closed position, since the releasable ratchet sleeve 45 will secure the mandrel to the housing, and prevent inadvertent downward telescoping of the mandrel within the latter.

It is, accordingly, apparent that a subsurface valve apparatus has been provided in which the predominance of fluid pressure either internally or externally of the apparatus is incapable of shifting or blowing the elastic sealing members out of their appropriate assembled positions in the valve, during the shifting of the valve to either open position or to closed position.

The inventor claims:

1. In a valve: first and second valve members movable one within the other; said valve having a pair of fluid passages adapted to be placed in communication with each other or out of communication with each other; said first member having a first circumferential groove therein; a first elastic seal ring in said groove; said second member having a second circumferential groove therein; a second elastic seal ring in said second groove; an annular member adapted to be located in the path of fluid flow between said passages and movable longitudinally along both of said first and second valve members and having inner and outer generally cylindrical surfaces simultaneously engageable with both of said seal rings to prevent flow of fluid between said passages; one of said valve members being movable with respect to the other of said valve members to enable said annular member to move out of engagement with at least one of said seal rings to permit flow of fluid between said passages.

2. In a valve: an outer member; and inner member telescopically arranged within said outer member; said valve having a pair of fluid passages adapted to be placed in communication with each other or prevented from communicating with each other; said outer member having an internal circumferential groove; a first elastic seal ring in said internal groove; said inner member having an external circumferential groove therein; a second elastic seal ring in said external groove; an annular member adapted to be located in the path of fluid flow between said passages and disposed between and movable longitudinally along both of said valve members and having inner and outer cylindrical surfaces adapted to simultaneously engage said seal rings to prevent flow of fluid between said passages; one of said valve members being movable with respect to the other of said valve members to enable said annular member to move out of engagement with at least one of said seal rings to permit flow of fluid between said passages.

3. In a valve: an outer member; an inner member telescopically arranged within said outer member; said valve having a pair of fluid passages adapted to be placed in communication with each other or prevented from communicating with each other; said outer member having an internal circumferential groove; a first elastic seal ring in said internal groove; said inner member having an external circumferential groove therein; a second elastic seal ring in said external groove; an annular member adapted to be located in the path of fluid flow between said passages and disposed between and movable longitudinally along both of said valve members and having inner and outer cylindrical surfaces adapted to simultaneously engage said seal rings to prevent flow of fluid between said passages; said annular member being movable relatively with said inner member out of engagement with said first seal ring in a direction toward one of said passages to permit flow of fluid between said passages; said inner member being movable relatively to said annular member and outer member in a direction toward said one passage to bring said second seal ring out of engagement with said annular member to permit flow of fluid between said passages.

4. In a valve: an outer member; an inner member telescopically arranged within said outer member; said valve having a pair of fluid passages adapted to be placed in communication with each other or prevented from communicating with each other; a first elastic seal ring in said outer member; a second elastic seal ring on said inner member; an annular member adapted to be located in the path of fluid flow between said passages and disposed between and movable longitudinally along both of said valve members and having inner and outer cylindrical surfaces adapted to simultaneously engage said seal rings to prevent flow of fluid between said passages; one of said valve members being movable with respect to the other of said valve members to enable said annular member to move out of engagement with at least one of said seal rings to permit flow of fluid between said passages.

5. In a valve: an outer member; an inner member telescopically arranged within said outer member; said valve having a pair of fluid passages adapted to be placed in communication with each other or prevented from communicating with each other; a first elastic seal ring in said outer member; a second elastic seal ring on said inner member; an annular member adapted to be located in the path of fluid flow between said passages and disposed between and movable longitudinally along both of said valve members and having inner and outer cylindrical surfaces adapted to simultaneously engage said seal rings to prevent flow of fluid between said passages; said annular member being movable relatively with said inner member out of engagement with said first seal ring in a direction toward one of said passages to permit flow of fluid between said passages; said inner member being movable relatively to said annular member and outer member in a direction toward said one passage to bring said second seal ring out of engagement with said annular member to permit flow of fluid between said passages.

6. In a valve: an outer member; an inner member telescopically arranged within said outer member; said valve having a pair of fluid passages adapted to be placed in communication with each other or prevented from communicating with each other; a first elastic seal ring in said outer member; a second elastic seal ring on said inner member; an annular member adapted to be located in the path of fluid flow between said passages and disposed between and movable longitudinally along both of said valve members and having inner and outer cylindrical surfaces adapted to simultaneously engage said seal rings to prevent flow of fluid between said passages; one of said valve members being movable with respect to the other of said valve members to enable said annular member to move out of engagement with at least one of said seal rings to permit flow of fluid between said passages; stop means on said outer member engaged by said annular member to locate said annular member with its outer surface disposed across and engaging said first seal ring; and stop means on said inner member engaged by said annular member to locate said annular member with its inner surface disposed across and engaging said second seal ring.

7. In a tubular control valve adapted to be secured to a tubular string for operation in a well bore; tubular body means having a side port; a tubular member connectible to the tubular string and telescopically arranged within said body means; said tubular member having passage means adapted to communicate with said port; a first elastic seal ring carried by said body means below said port; a second elastic seal ring carried by said tubular member; an annular member disposed between and movable longitudinally along said tubular member and body means and having inner and outer generally cylindrical surfaces adapted to simultaneously engage said seal rings to prevent flow of fluid between said passage means and side port; said tubular member being movable upwardly to elevate said second seal ring out of engagement with said annular member to permit such flow of fluid; and said tubular member and annular member being movable upwardly to allow said annular member to elevate out of engagement from said first seal ring to permit such flow of fluid.

8. In a tubular control valve adapted to be secured to a tubular string for operation in a well bore; tubular body means having a side port; a tubular member connectible to the tubular string and telescopically arranged within said body means; said tubular member having passage means adapted to communicate with said port; a first elastic seal ring carried by said body means below said port; a second elastic seal ring carried by said tubular member; an annular member disposed between and movable longitudinally along said tubular member and body means and having inner and outer generally cylindrical surfaces adapted to simultaneously engage said seal rings to prevent flow of fluid between said passage means and side port; said tubular member being movable upwardly to elevate said second seal ring out of engagement with said annular member to permit such flow of fluid; and said tubular member and annular member being movable upwardly to allow said annular member to elevate out of engagement from said first seal ring to permit such flow of fluid; stop means on said body means engaged by said annular member to locate said annular member with its outer surface disposed across and engaging said first seal ring; and stop means on said tubular member engaged by said annular member to locate said annular member with its inner surface disposed across and engaging said second seal ring.

9. In a tubular control valve adapted to be secured to a tubular string for operation in a well bore; tubular body means having a side port; a tubular member connectible to the tubular string and telescopically arranged within said body means; said tubular member having passage means adapted to communicate with said port; said body means having an internal circumferential groove; a first elastic seal ring in said internal groove; said tubular member having an external circumferential groove therein; a second elastic seal ring in said external groove; an annular member disposed between and movable longitudinally along said tubular member and body means and having inner and outer generally cylindrical surfaces adapted to simultaneously engage said seal rings to prevent flow of fluid between said passage means and side port; said tubular member being movable upwardly to elevate said second seal ring out of engagement with said annular member to permit such flow of fluid; and said tubular member and annular member being movable upwardly to allow said annular member to elevate out of engagement from said first seal ring to permit such flow of fluid.

10. In a tubular control valve adapted to be secured to a tubular string for operation in a well bore; tubular body means having a side port; a tubular member connectible to the tubular string and telescopically arranged within said body means; said tubular member having passage means adapted to communicate with said port; said body means having an internal circumferential groove; a first elastic seal ring in said internal groove; said tubular member having an external circumferential groove therein; a second elastic seal ring in said external groove; an annular member disposed between and movable longitudinally along said tubular member and body means and having inner and outer generally cylindrical surfaces adapted to simultaneously engage said seal rings to prevent flow of fluid between said passage means and side port; said tubular member being movable upwardly to elevate said second seal ring out of engagement with said annular member to permit such flow of fluid; said tubular member and annular member being movable upwardly to allow said annular member to elevate out of engagement from said first seal ring to permit such flow of fluid; stop means on said body means engaged by said annular member to locate said annular member with its outer surface disposed across and engaging said first seal ring; and stop means on said tubular member engaged by said annular member to locate said annular member with its inner surface disposed across and engaging said second seal ring.

11. In a tubular control valve adapted to be secured to a tubular string for operation in a well bore; tubular body means having a side port; a tubular member telescopically arranged within said body means; said tubular member having passage means adapted to communicate with said port; a first elastic seal ring carried by said body means to one side of said port; a second elastic seal ring carried by said tubular member; an annular member disposed between and movable longitudinally along said tubular member and body means and having inner and outer generally cylindrical surfaces adapted to simultaneously engage said seal rings to prevent flow of fluid between said passage means and side port; said tubular member being movable longitudinally to shift said second seal ring out of engagement with said annular member to permit such flow of fluid; and said tubular member and annular member being movable longitudinally in the same direction to allow said annular member to move in a direction toward said port out of engagement from said first seal ring to permit such flow of fluid.

No references cited.